United States Patent
Ooyama

(10) Patent No.: US 10,536,311 B2
(45) Date of Patent: Jan. 14, 2020

(54) DIRECT CONVERSION RECEIVER

(71) Applicant: ASAHI KASEI MICRODEVICES CORPORATION, Tokyo (JP)

(72) Inventor: Tetsutaro Ooyama, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 16/190,589

(22) Filed: Nov. 14, 2018

(65) Prior Publication Data

US 2019/0149374 A1 May 16, 2019

(30) Foreign Application Priority Data

Nov. 15, 2017 (JP) .................................. 2017-220181

(51) Int. Cl.
| | |
|---|---|
| *H04B 1/04* | (2006.01) |
| *H04B 17/00* | (2015.01) |
| *H04B 1/525* | (2015.01) |
| *H04B 1/40* | (2015.01) |
| *H04L 27/14* | (2006.01) |
| *H04B 1/00* | (2006.01) |

(52) U.S. Cl.
CPC ................ *H04L 27/14* (2013.01); *H04B 1/00* (2013.01)

(58) Field of Classification Search
CPC ........... H04L 27/14; H04B 1/00; H04B 1/109; H04B 1/525; H04B 1/40; H04B 1/04; H04B 17/00
See application file for complete search history.

(56) References Cited

U.S. PATENT DOCUMENTS

| | | | |
|---|---|---|---|
| 4,944,025 A | 7/1990 | Gehring et al. | |
| 5,003,621 A | 3/1991 | Gailus | |
| 5,815,821 A * | 9/1998 | Pettersson | H04B 1/109 370/311 |
| 6,298,221 B1 * | 10/2001 | Nguyen | H04B 1/109 455/234.1 |

(Continued)

FOREIGN PATENT DOCUMENTS

| | | |
|---|---|---|
| JP | H06-276243 A | 9/1994 |
| JP | 2002-164741 A | 6/2002 |

(Continued)

*Primary Examiner* — Pablo N Tran
(74) *Attorney, Agent, or Firm* — Morgan, Lewis & Bockius LLP

(57) ABSTRACT

A direct conversion receiver configured to down-convert a received RF signal by using a local signal and demodulate the down-converted signal, the direct conversion receiver including: a power detector unit configured to detect a signal strength of the down-converted signal; a power determinator unit configured to determine whether the signal strength detected by the power detector unit is equal to or smaller than a previously set threshold value; and a local oscillator circuit configured to output, as the local signal, a first local signal when the power determinator unit determines that the signal strength is equal to or smaller than the threshold value, and output, as the local signal, a second local signal set to a frequency obtained by adding a previously set offset frequency to a frequency of the first local signal when the power determinator unit determines that the signal strength is larger than the threshold value.

6 Claims, 3 Drawing Sheets

(56) References Cited

U.S. PATENT DOCUMENTS

| | | | | |
|---|---|---|---|---|
| 6,965,655 | B1* | 11/2005 | Mostov | H03G 3/3068 375/345 |
| 7,283,851 | B2* | 10/2007 | Persico | H04B 1/1615 455/574 |
| 7,299,021 | B2* | 11/2007 | Prssinen | H04B 1/109 375/345 |
| 7,684,775 | B2* | 3/2010 | Vepsalainen | H04B 1/30 455/266 |
| 8,107,914 | B2* | 1/2012 | Firoiu | H04B 1/30 455/189.1 |
| 8,442,473 | B1* | 5/2013 | Kaukovuori | H04B 1/16 375/324 |
| 8,472,890 | B2* | 6/2013 | Zhuo | H04B 1/525 455/115.3 |
| 8,787,854 | B2* | 7/2014 | Liu | H04W 52/0274 455/141 |
| 9,503,139 | B2 | 11/2016 | Chen et al. | |
| 9,712,113 | B2* | 7/2017 | Selvanayagam | H03D 7/1441 |
| 9,755,678 | B2* | 9/2017 | Selvanayagam | H03F 1/0205 |
| 2002/0012407 | A1 | 1/2002 | Sakurai | |
| 2002/0167369 | A1 | 11/2002 | Yamaji et al. | |
| 2005/0075087 | A1 | 4/2005 | Yamaji et al. | |
| 2005/0272396 | A1 | 12/2005 | Sakurai | |
| 2010/0130156 | A1 | 5/2010 | Jin et al. | |
| 2012/0313680 | A1 | 12/2012 | Kodama et al. | |
| 2013/0114769 | A1 | 5/2013 | Fernando | |
| 2015/0236878 | A1 | 8/2015 | Okuhata | |
| 2017/0082756 | A1* | 3/2017 | Parikh | G01S 19/37 |

FOREIGN PATENT DOCUMENTS

| | | |
|---|---|---|
| JP | 2003-032048 A | 1/2003 |
| JP | 2009-147526 A | 7/2009 |
| JP | 2015-154241 A | 8/2015 |
| JP | 2017-034545 A | 2/2017 |
| WO | 2011/114408 A1 | 9/2011 |

* cited by examiner (a)

(b)

DIRECT CONVERSION RECEIVER

CROSS REFERENCE TO RELATED APPLICATIONS AND INCORPORATION BY REFERENCE

This application claims benefit of priority under 35 USC 119 based on Japanese Patent Application No. 2017-220181 filed on Nov. 15, 2017, the entire contents of which are incorporated by reference herein.

TECHNICAL FIELD

The present invention relates to direct conversion receivers.

BACKGROUND ART

Conventionally, the business-use radio communication industry employs superheterodyne systems as a signal receiving system. In addition, recently, direct conversion systems small in mounting area have been expected to meet needs for miniaturization and the like.

It is known that, in receivers using such direct conversion systems, a DC offset occurs on a baseband signal, whereby reception sensitivity is degraded. Thus, for example, there have been conventionally proposed methods such as DC offset attenuation using a high pass filter and DC offset attenuation particularly suitable to perform communication using an FM/FSK modulation system (e.g., see JP 2017-34545 A).

SUMMARY

According to one aspect of the present invention, there is provided a direct conversion receiver configured to down-convert a received RF signal by using a local signal and demodulate the down-converted signal, the direct conversion receiver including: a power detector unit configured to detect a signal strength of the down-converted signal; a power determinator unit configured to determine whether or not the signal strength detected by the power detector unit is equal to or smaller than a previously set threshold value; and a local oscillator circuit configured to output, as the local signal, a first local signal when the power determinator unit determines that the signal strength is equal to or smaller than the threshold value, and output, as the local signal, a second local signal set to a frequency obtained by adding a previously set offset frequency to a frequency of the first local signal when the power determinator unit determines that the signal strength is larger than the threshold value.

DETAILED DESCRIPTION

The following detailed description describes many particular specific structures so that exemplary embodiments of the present invention are fully understood. However, it is obvious that the present invention is not limited thereto, and other embodiments can be implemented. In addition, the following embodiments do not limit the present invention according to the claims, and include all combinations of characteristic structures described in the embodiments.

In radio communications, when a signal wave modulating a carrier wave stops (e.g., when the other party in a call stops talking during conversation), a CW signal (an unmodulated continuous wave: a Continuous Wave) is output. When such a CW signal is received, a direct conversion receiver in which a received RF signal and a local signal are set to the same frequency should output a DC (direct current) component after down-converting the received RF signal, i.e., the CW signal, into a baseband signal by a quadrature demodulator unit.

However, in an actual receiver, variation in a reference frequency generator unit used causes a frequency error of about ±1 kHz between the received CW signal and the local signal. Due to that, a signal component corresponding to the frequency error is down-converted by the quadrature demodulator unit and appears in the baseband signal, whereby reception quality may be degraded.

For example, when an FM modulated signal, which is commonly used by business-use analog radio equipment, is received, a signal component corresponding to a frequency error appearing in a baseband signal may significantly influence the sound quality of an FM demodulated signal obtained after FM demodulating the baseband signal.

Figure 4A:
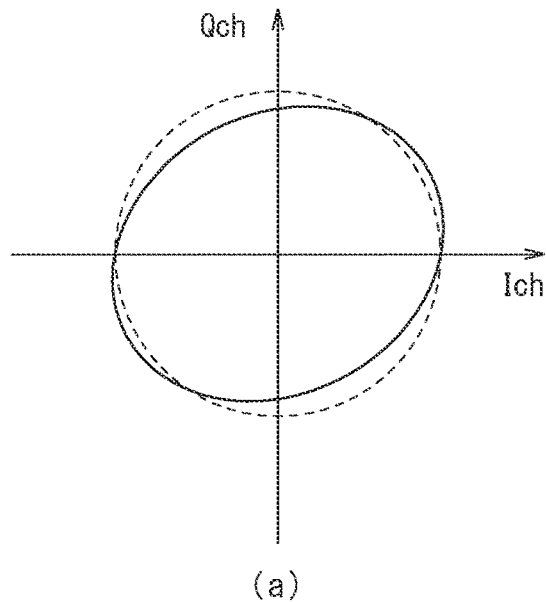
FIGS. 4A and 4B are descriptive diagrams for describing the advantageous effects of the direct conversion receiver according to the one embodiment of the present invention.

For example, when even-order distortion due to the frequency error occurs in the baseband signal down-converted from the input received RF signal, the baseband signal form a vector trajectory like an ellipse on an I/Q orthogonal coordinate system, as illustrated in FIG. 4A. Additionally, for example, when odd-order distortion occurs, the baseband signal form a vector trajectory like a square on the I/Q orthogonal coordinate system, as illustrated in FIG. 4B.

Herein, in general, when a down-converted CW signal is FM demodulated, a signal obtained as a result of the FM demodulation becomes a DC component, since no frequency change occurs in CW signals. In addition, typically, in direct conversion receivers, an FM demodulated signal is passed through an audio filter to attenuate signals of bands other than a human audible band. Thus, the DC component of the CW signal obtained as the result of the FM demodulation is attenuated by the audio filter after the FM demodulation, and sounds like, for example, white noise (a static sound) to a user of the receiver.

Figure 4B:
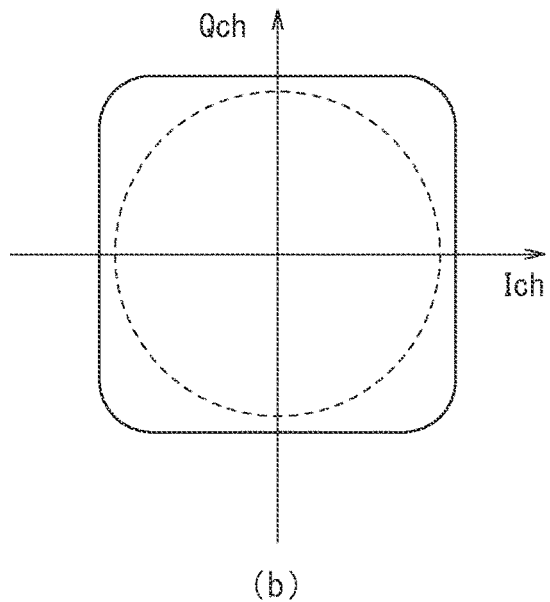

However, as described above, when the baseband signal including the distortion component produced due to the frequency error between the CW signal and the local signal is FM demodulated, a signal component of $2 \times \Delta f$ kHz appears in the FM demodulated signal if the baseband signal has the vector trajectory illustrated in FIG. 4A, and a signal component of $4 \times \Delta f$ kHz appears therein if the baseband signal has the vector trajectory illustrated in FIG. 4B, in both of which $\Delta f$ represents the frequency error between the CW signal and the local signal.

In this case, when the frequency error Δf is 1 kHz, the frequency error Δf appears as a signal component of 2×Δf=2 kHz or 4×Δf=4 kHz in the FM demodulated signal, and, is consequently output as a tone signal from the receiver. Accordingly, the tone signal sounds like a very harsh sound to the user of the receiver.

Figure 5:
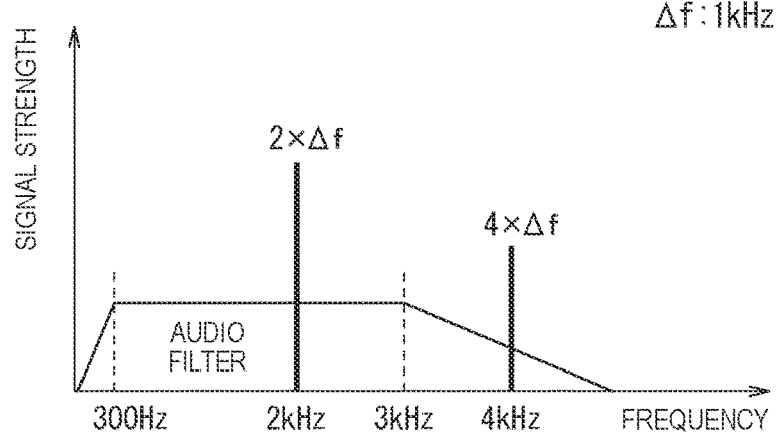
FIG. 5 is a descriptive chart for describing the advantageous effects of the direct conversion receiver according to the one embodiment of the present invention.

In the receiver, the signal after the FM demodulation is filtered by the audio filter. However, in the examples illustrated in FIGS. 4A and 4B, for example, the signal component appearing at 4 kHz is outside a band of the audio filter (e.g., about from 300 Hz to 3 kHz), and thus is attenuated, whereas the signal component appearing at 2 kHz remains without being attenuated by the audio filter, as illustrated in FIG. 5. Due to this, the signal component is output as a tone signal from the receiver, and becomes a factor that causes sound quality degradation.

An embodiment described below has been made focusing on the conventional unsolved problem, and it is object of the embodiment to provide a direct conversion receiver that can suppress reception quality degradation due to reception of a CW signal.

Hereinafter, one embodiment of the present invention will be described with reference to the drawings. In the following description of the drawings, the same portions are denoted by the same reference signs. However, the drawings are schematic, and the relationships between thicknesses and planar dimensions, the ratios of thicknesses between respective layers, and the like are different from actual ones.

Note that while the following description of the embodiment exemplifies a case where an FM modulated signal carrying an audio signal is received by a direct conversion system, the present invention is not limited thereto. The present invention is applicable to modulated signals of various modulation systems carrying various kinds of signals.

Figure 1:
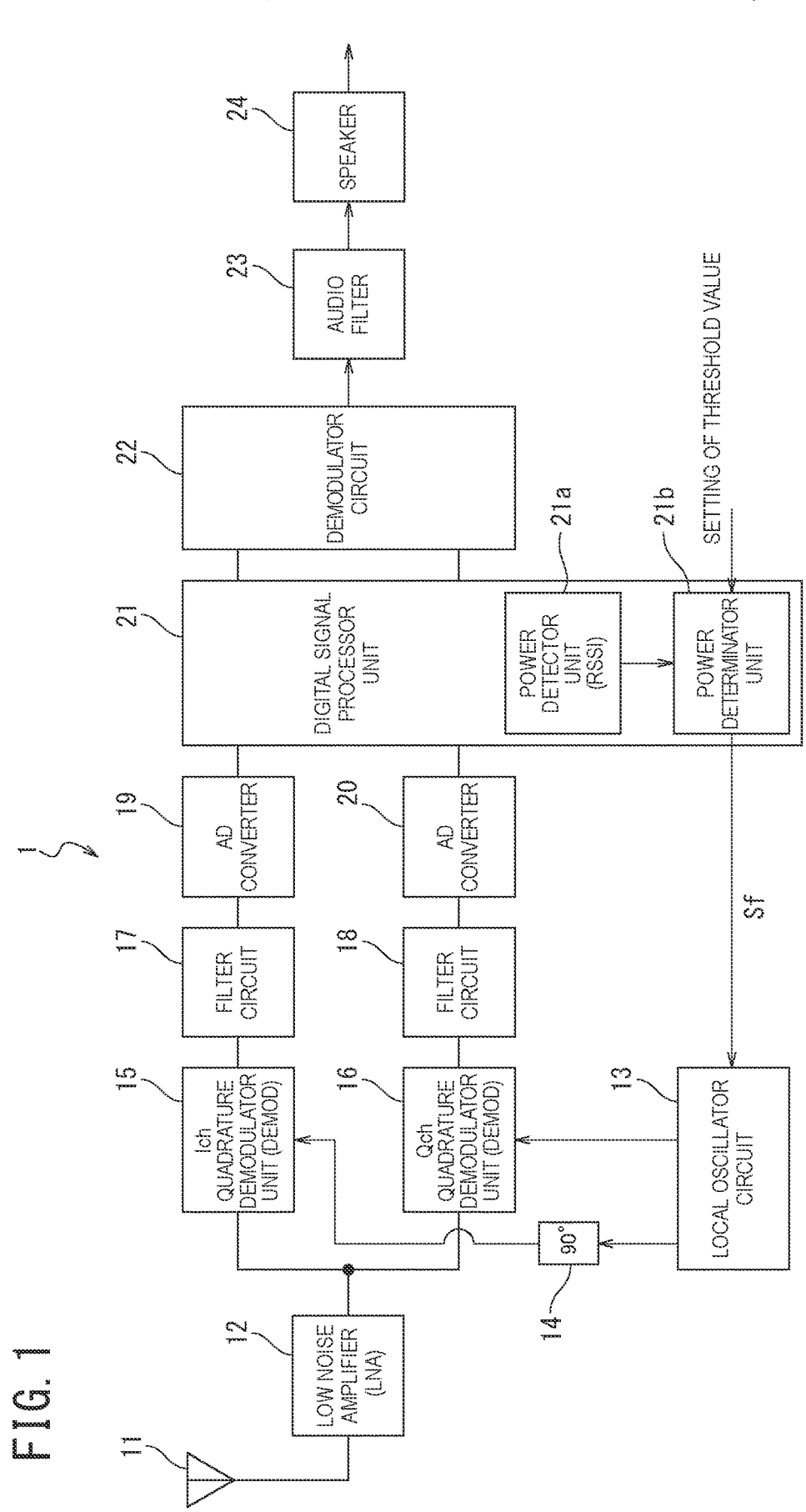
FIG. 1 is a block diagram illustrating one example of a direct conversion receiver according to one embodiment of the present invention.

FIG. 1 is a circuit diagram illustrating one example of the schematic structure of a direct conversion receiver (hereinafter simply referred to as "receiver") 1, which illustrates one embodiment of the present invention.

The receiver 1 according to the one embodiment of the present invention employs a direct conversion system in which a digitally modulated carrier wave is multiplied by each of two local signals having orthogonal phases to down-convert into a near-DC signal, and the down-converted signal is quadrature-demodulated.

As illustrated in FIG. 1, the receiver 1 includes an antenna 11, a low noise amplifier (LNA) 12, a local oscillator circuit 13, a phase shifter 14, an Ich quadrature demodulator unit 15, and a Qch quadrature demodulator unit 16. The receiver 1 further includes filter circuits 17 and 18, AD converters 19 and 20, a digital signal processor unit 21, a demodulator circuit 22, an audio filter 23, and a speaker 4. Note that the Ich quadrature demodulator unit 15 and the Qch quadrature demodulator unit 16 correspond to quadrature demodulators, and the digital signal processor unit 21 corresponds to a signal processor unit.

In FIG. 1, the antenna 11 receives an FM modulated signal.

The low noise amplifier 12 amplifies, with low noise, an RF signal (a high frequency signal) (hereinafter referred to as "received RF signal) received via the antenna 11, and outputs to the Ich quadrature demodulator unit 15 and the Qch quadrature demodulator unit 16.

The local oscillator circuit 13 produces a local signal for converting the frequency of the received RF signal. The local oscillator circuit 13 according to the one embodiment of the present invention outputs, as the local signal, two local signals L1 and L2 having different frequencies. The frequency of the local signal L1 is set to be the same as a frequency Frf of the received RF signal. Ideally, the frequency of the local signal L1 is the same as the frequency Frf of the received RF signal, but actually, a frequency error of about 1 kHz may occur. The frequency of the local signal L2 is set to a frequency "Frf+Foff" obtained by adding a previously set offset frequency Foff to the frequency Frf of the received RF signal. Additionally, the local oscillator circuit 13 receives a selection signal Sf directing which of the local signals L1 and L2 is to be selected from the digital signal processor unit 21, and produces and outputs the local signal L1 or L2 designated by the selection signal Sf. Note that during a period of time in which the selection signal Sf is not input from the digital signal processor unit 21, such as during a start-up period of time, the local oscillator circuit 13 outputs the local signal L1 as an initial value. The offset frequency Foff is set to a value that allows the frequency band of a signal component appearing in a baseband signal due to distortion resulting from a frequency error between a CW signal and the local signal to be offset to a band that allows attenuation by the audio filter 23. The offset frequency Foff is previously detected by experiment or the like.

The local signal produced by the local oscillator circuit 13 is input to the Ich quadrature demodulator unit 15 via the phase shifter 14, and also is directly input to the Qch quadrature demodulator unit 16.

The phase shifter 14 shifts the phase of the local signal input from the local oscillator circuit 13 by 90 degrees.

The Ich quadrature demodulator (DEMOD: Demodulator) unit 15 multiplies the received RF signal input from the low noise amplifier 12 by the local signal input from the phase shifter 14. Additionally, the Qch quadrature demodulator (DEMOD) unit 16 multiplies the received RF signal input from the low noise amplifier 12 by the local signal input from the local oscillator circuit 13. By doing this, the Ich quadrature demodulator unit 15 and the Qch quadrature demodulator unit 16 down-convert the received RF signal from the low noise amplifier 12 into a baseband frequency at DC level or near DC level, and output an I signal and a Q signal that are phase-shifted by 90 degrees from each other.

The I signal output from the Ich quadrature demodulator unit 15 is subjected to processing, such as attenuation of signals of bands other than a frequency corresponding to a target channel and interfering waves and anti-aliasing by the filter circuit 17, converted into a digital signal by the AD converter 19, and then input to the digital signal processor unit 21. The Q signal output from the Qch quadrature demodulator unit 16 is also processed by the filter circuit 18 and the AD converter 20, and then input to the digital signal processor unit 21, similarly to the I signal.

The digital signal processor unit 21 performs predetermined pieces of signal processing on the I signal and the Q signal input via the AD converters 19 and 20, such as, for example, further attenuation of interfering waves not completely eliminated by the filter circuits 17 and 18 and elimination of DC offset signals, and then outputs the I signal and the Q signal to the demodulator circuit 22. In addition, the digital signal processor unit 21 includes a power detector unit (RSSI: received signal strength indicator) 21a and a power determinator unit 21b.

The power detector unit 21a detects the signal strength of baseband signals after filtering processing by the filter circuits 17 and 18, on the basis of the I signal and the Q signal input via the AD converters 19 and 20.

The power determinator unit 21b performs determination on the basis of the signal strength detected by the power detector unit 21a. Specifically, the power determinator unit 21b determines whether or not the signal strength detected by the power detector unit 21a is larger than a previously set threshold value. When the signal strength is larger than the threshold value, the power determinator unit 21b outputs the selection signal Sf designating the local signal L2 to the local oscillator circuit 13, and when the signal strength is equal to or smaller than the threshold value, the power determinator unit 21b outputs the selection signal Sf designating the local signal L1 to the local oscillator circuit 13. Note that while the present description has described the case where switching between the local signals L1 and L2 are performed according to the magnitude relationship between the signal strength detected by the power detector unit 21a and the threshold value, the invention is not limited thereto. For example, the power determinator unit 21b may set two threshold values and switch between the local signals L1 and L2 by hysteresis characteristics.

The demodulator circuit 22 determines whether or not there is reception of a received signal on the basis of the I signal and the Q signal input from the digital signal processor unit 21. When it is determined that there is the reception of a received signal, the demodulator circuit 22 extracts the information of amplitude, frequency, and phase on the basis of the I signal and the Q signal, and demodulates the received signal on the basis thereof. Specifically, the demodulator circuit 22 includes, for example, an RSSI measurement unit configured to detect a signal strength, and determines that there is the reception of a received signal when the signal strength measured by the RSSI measurement unit exceeds a previously set threshold value for determining signal reception. Only when it is determined that there is the reception of a received signal, the demodulator circuit 22 demodulates the received signal on the basis of the I and Q signals, and then outputs as an FM demodulated signal to the audio filter 23.

The audio filter 23 attenuates signals of bands other than a human audible band, for example, a band of from 300 Hz to 3 kHz. The FM demodulated signal attenuated by the audio filter 23 is output to the speaker 24.

Next, operation of the above embodiment will be described.

Figure 2:
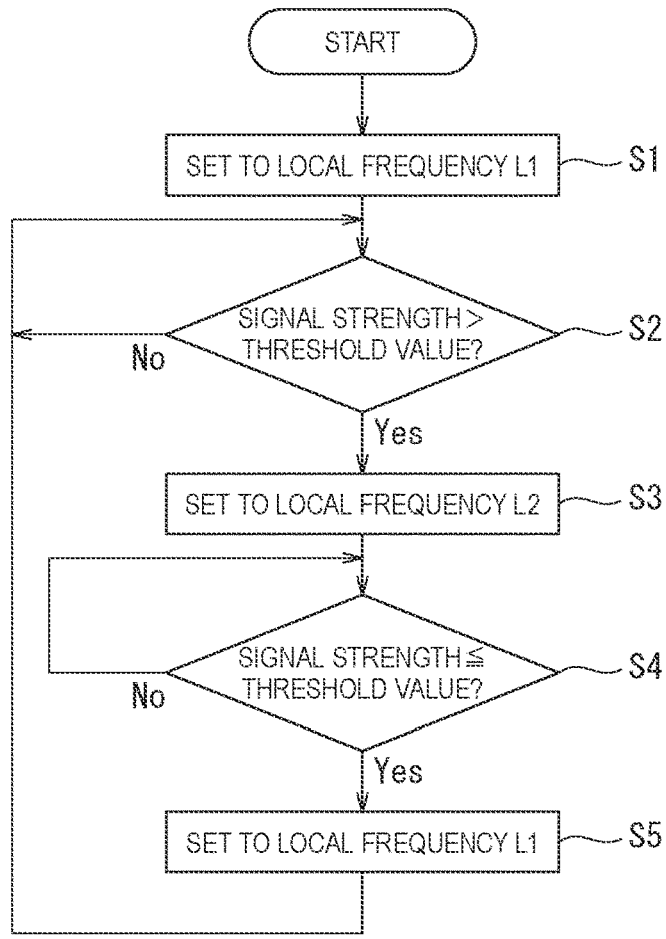
FIG. 2 is a flowchart illustrating one example of the processing procedure of a power determinator unit.

FIG. 2 is a flowchart illustrating one example of the processing procedure of the power determinator unit 21b.

In the receiver 1, when started, the selection signal Sf designating the local signal L1 as an initial state is output from the power determinator unit 21b to the local oscillator circuit 13 (step S1). The local oscillator circuit 13 outputs the local signal L1 that has a frequency set to be the same as the frequency of the received RF signal.

Thus, the received RF signal input to the antenna 11 is amplified with low noise by the low noise amplifier 12, and then multiplied by the local signals L1 that have phases different from each other by 90 degrees by the Ich quadrature demodulator unit 15 and the Qch quadrature demodulator unit 16 to produce the I signal and the Q signal. The I and Q signals are input to the digital signal processor unit 21 via the filter circuits 17, 18 and the AD converters 19, 20, and subjected to predetermined processing by the digital signal processor unit 21, followed by FM demodulation by the demodulator circuit 22. The FM demodulated signal demodulated by the demodulator circuit 22 is output from the speaker 24 after attenuating signals of bands other than a predetermined band by the audio filter 23.

In this case, on the basis of the I signal and the Q signal, the power detector unit 21a detects the signal strength of the baseband signals after filter processing by the filter circuits 17 and 18 (step S2), and designates the local signal L1 during a period of time in which the signal strength is equal to or smaller than a threshold value. Accordingly, the received RF signal input to the antenna 11 is down-converted by the local signal L1 set to the same frequency as that of the received RF signal.

On the other hand, when the signal strength of the baseband signals is larger than the threshold value, the power detector unit 21a moves to step S3, and outputs the selection signal Sf designating the local signal L2.

The local oscillator circuit 13 switches from the local signal L1 to the local signal L2 set to a frequency obtained by adding the offset frequency Foff to the frequency of the received signal. Accordingly, the received RF signal input to the antenna 11 is down-converted by the local signal L2 set to the frequency obtained by adding the offset frequency Foff to the frequency of the received RF signal.

When the signal strength of the baseband signals becomes smaller than the threshold value, again, from the above state, the power detector unit 21a moves from step S4 to step S5, and switches to the selection signal Sf designating the local signal L1. Accordingly, the received RF signal input to the antenna 11 is down-converted by the local signal L1 set to the same frequency as that of the received RF signal. Thereafter, similarly, down-conversion is performed using the local signal L1 or L2 according to whether or not the signal strength of the baseband signals is equal to or larger than the threshold value.

Herein, in a state where the other party in a call stops talking during conversation and thereby a CW signal is input as a received RF signal, a frequency error between the CW signal and the local signal, or the like, may cause distortion in the baseband signals, for example, as illustrated in FIGS. 4A and 4B. When the baseband signals including the distortion are FM demodulated, a signal component, for example, at 2×Δf kHz or 4×Δf kHz due to the distortion component, i.e., the frequency error appears in the FM demodulated signal, although it should originally be soundless.

In this case, when the signal strength of the baseband signals after filtering processing by the filter circuits 17 and 18 is smaller than the threshold value, down-conversion is performed using the local signal L1. In other words, the received RF signal is down-converted into the baseband signals by a zero-IF receiving system in which the received RF signal is multiplied by the local signal having the same frequency as the frequency of the received RF signal.

For example, when the frequency error Δf is 1 kHz, the distortions illustrated in FIGS. 4A and 4B each appear as the signal component at 2×Δf=2 kHz or 4×Δf=4 kHz in the FM demodulated signal. By filtering the FM demodulated signal through the audio filter 23, the signal component appearing at 4 kHz can be attenuated, but the signal component appearing at 2 kHz cannot be attenuated. Since the FM demodulated signal includes the signal component at 2 kHz, a tone signal is output from the receiver 1. In that case, however, the signal strength of the baseband signals is smaller than the threshold value. Thus, even when output as the tone signal from the receiver 1, it is not heard by the user of the receiver 1, or even if heard, ignorable to him or her.

On the other hand, in the state where a CW signal is input as a received RF signal, when the signal strength of the baseband signals filtered by the filter circuits 17 and 18 becomes large and exceeds the threshold value (e.g., as in a situation where both parties in a call are positioned relatively close to each other), down-conversion is performed using the local signal L2. The Ich quadrature demodulator unit 15 and the Qch quadrature demodulator unit 16 perform down-conversion using the local signal L2 set to a frequency "Frf+Foff" different from the frequency of the received RF signal. In other words, the received RF signal is down-converted by a low-IF receiving system in which the received RF signal is multiplied by the local signal having the frequency different from the frequency of the received RF signal.

Figure 3:
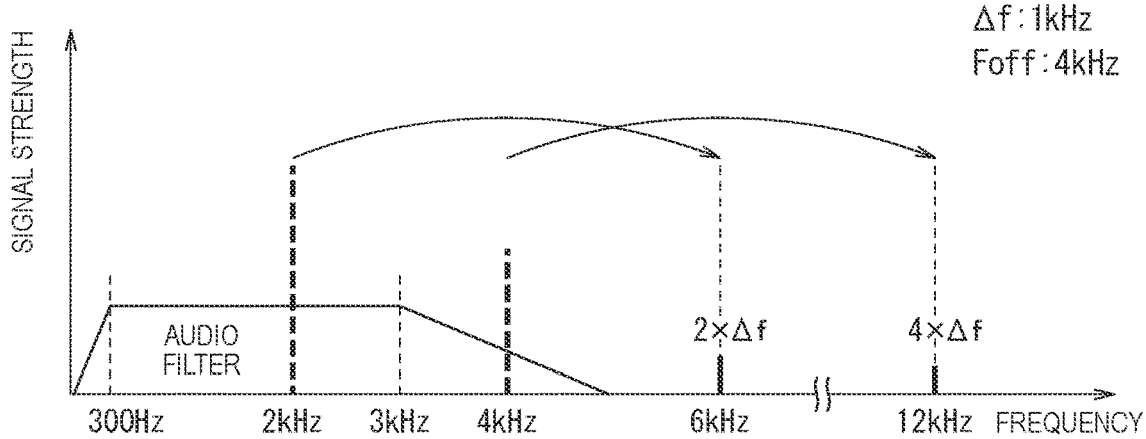
FIG. 3 is a descriptive chart for describing advantageous effects of the direct conversion receiver according to the one embodiment of the present invention.

In this case, a signal component due to the frequency error $\Delta f$ appears, as a signal component having a frequency of "offset frequency Foff–$\Delta f$", in the FM demodulated signal. Due to this, when the distortions illustrated in FIGS. 4A and 4B occur, they each appear as a signal component of 2×(Foff–$\Delta f$)=6 kHz or 4×(Foff–$\Delta f$)=12 kHz, where the offset frequency Foff is 4 kHz and the frequency error $\Delta f$ is 1 kHz, as illustrated in FIG. 3. Thus, both signal components are attenuated by the audio filter 23. In other words, the tone signal output from the receiver 1 is reduced.

In short, even when the signal strength of the baseband signals obtained by down-converting the received RF signal from the antenna 11 is large and thereby a relatively large distortion occurs in the baseband signals, down-converting using the local signal L2 allows the frequency of a frequency error-induced signal component appearing in the FM demodulated signal to be set outside an audio band of frequencies that can be passed through the audio filter 23. Accordingly, the frequency error-induced signal component appearing in the FM demodulated signal can be attenuated by the audio filter 23, which can consequently prevent the user of the receiver 1 from hearing a tone signal composed of the frequency error-induced signal component.

Contrarily, when the frequency error $\Delta f$ is "–1 kHz" and the signal strength of the baseband signals is small, down-conversion is performed using the local signal L1. Even if a frequency error occurs between the CW signal and the local signal L1 and thereby a frequency error-induced signal component appears in the FM demodulated signal, the signal component having a frequency outside the audible band is attenuated by the audio filter 23. In addition, even in the case of a signal component in the audible band, the signal strength of the baseband signals is originally small, so that even when the FM demodulated signal includes the frequency error-induced signal component, a tone signal of the signal component is not heard by the user of the receiver 1, or even if heard, ignorable to him or her.

Additionally, when the signal strength of the baseband signals is large, and larger than the threshold value, down-conversion is performed using the local signal L2. For example, when the frequency error $\Delta f$ is –1 kHz and the offset frequency Foff is 4 kHz, if the distortions illustrated in FIGS. 4A and 4B occur, a signal component of 2×(Foff–$\Delta f$)=10 kHz or 4×(Foff–$\Delta f$)=20 kHz appears in the FM demodulated signal. Thus, the frequency error-induced signal component is attenuated by passing through the audio filter 23, which prevents the user of the receiver 1 from hearing as a tone signal.

Thus, in the present invention, when the signal strength of down-converted signals is larger than a threshold value, down-conversion is performed using the local signal L2 obtained by offsetting the frequency of a received RF signal.

By doing this, when a CW signal is input as a received RF signal, even if a signal component appearing due to a frequency error between the CW signal and the local signal appears in down-converted signals, the frequency of the signal component can be separated from the frequency band of the baseband signals. Thus, using an appropriate frequency filter as needed enables attenuation of a signal component due to a frequency error. For example, in the above-described embodiment, the signal component due to the frequency error has been attenuated by passing the FM modulated signal through the audio filter 23.

Herein, even when the other party in a call is talking, switching between the local signals L1 and L2 is performed according to the signal strength of the baseband signals. In that case, when the signal strength of the baseband signals is equal to or smaller than the threshold value, down-conversion is performed using the local signal L1 set to the same frequency as the frequency of the received RF signal, whereas when the signal strength of the baseband signals exceeds the threshold value, down-conversion is performed using the local signal L2 set to a frequency obtained by adding the offset frequency Foff to the frequency of the received RF signal. In other words, this is equivalent to performing receiving processing by the zero-IF receiving system when the signal strength of the baseband signals is equal to or smaller than the threshold value, and performing receiving processing by the low-IF receiving system when the signal strength of the baseband signals is larger than the threshold value. When switching from the zero-IF receiving system to the low-IF receiving system, it is possible to receive without causing any deficiency or the like in the received RF signal, for example, by switching the filter circuits 17 and 18 according to a baseband signal band. Accordingly, the occurrence of a tone signal that occurs due to the use of the zero-IF receiving system can be prevented while maintaining characteristics equivalent to those of the zero-IF receiving system.

Note that while the description hereinabove has been given of the case where the frequency error $\Delta f$ is ±1 kHz and the offset frequency Foff is 4 kHz, it is merely one example, and the present invention is not limited thereto.

As described above, the offset frequency Foff may be set to a value such that the frequency of a signal component that appears in an FM modulated signal due to a frequency error $\Delta f$ between a CW signal and the local signal L1 can be offset to a band other than the audible band of the audio filter 23. For example, the offset frequency Foff may be set in consideration of an attenuation band of the audio filter 23, a channel width of the receiver 1, the magnitude of the frequency error $\Delta f$, and the like. As one example, when the channel width of the receiver 1 is 12.5 kHz and the frequency error $\Delta f$ is 1 kHz, the offset frequency Foff is set to about 3.5 kHz.

Additionally, when the offset frequency Foff is too small, a signal component occurring due to the frequency error $\Delta f$ cannot be sufficiently attenuated by the audio filter 23, so that tone signal reduction cannot be sufficiently achieved. Conversely, when the offset frequency Foff is too large, it can interfere with an image signal, so that image signal protection and the like are needed, which makes the device complicated. It is thus preferable to set the offset frequency Foff in consideration of these facts.

Furthermore, while the above embodiment has described the case where the power detector unit 21a and the power determinator unit 21b are included in the digital signal processor unit 21, the present invention is not limited thereto. The power detector unit 21a can be arranged in any other place as long as it can detect the signal strength of a signal component having a frequency corresponding to a target channel of the receiver 1, in which signals of bands other than the frequency corresponding to the target channel of the receiver 1, interference waves, and the like are attenuated. Accordingly, for example, the signal strength of the baseband signals may be detected on the basis of a signal between the filter circuit 17 and the AD converter 19 and a signal between the filter circuit 18 and the AD converter 20.

According to the embodiment described above, the direct conversion receiver can suppress reception quality degradation due to the reception of a CW signal.

While some exemplary embodiments of the present invention have been described hereinabove, the embodiments are examples of devices and methods for embodying the technological ideas of the invention, and materials, shapes, structures, arrangements, and the like of constituent components are not specified by the technological ideas of the invention. Various changes can be added to the technological ideas of the invention in a technological range defined by the claims.

REFERENCE SIGNS LIST

1: Direct conversion receiver
2: Audio filter
11: Antenna
12: Low noise amplifier
13: Local oscillator circuit
15: Ich quadrature demodulator unit
16: Qch quadrature demodulator unit
21: Digital signal processor unit
21a: Power detector unit
21b: Power determinator unit
22: Demodulator circuit
23: Audio filter

The invention claimed is:

1. A direct conversion receiver configured to down-convert a received RF signal by using a local signal and demodulate the down-converted signal, the direct conversion receiver comprising:
   a power detector unit configured to detect a signal strength of the down-converted signal;
   a power determinator unit configured to determine whether or not the signal strength detected by the power detector unit is equal to or smaller than a previously set threshold value; and
   a local oscillator circuit configured to output, as the local signal, a first local signal when the power determinator unit determines that the signal strength is equal to or smaller than the threshold value, and output, as the local signal, a second local signal set to a frequency obtained by adding a previously set offset frequency to a frequency of the first local signal when the power determinator unit determines that the signal strength is larger than the threshold value.

2. The direct conversion receiver according to claim 1, wherein the first local signal is a local signal for down-converting the received RF signal by a zero-IF receiving system, and the second local signal is a local signal for down-converting the received RF signal by a low-IF receiving system.

3. The direct conversion receiver according to claim 1, further comprising:
   at least one quadrature demodulator unit configured to receive the received RF signal and the local signal and down-convert the received RF signal by using the local signal;
   a signal processor unit configured to perform predetermined signal processing on the signal down-converted by the at least one quadrature demodulator unit;
   a demodulator circuit configured to demodulate the down-converted signal output from the signal processor unit; and
   an audio filter configured to receive the signal demodulated by the demodulator circuit and attenuate signals of bands other than a previously set audio band.

4. The direct conversion receiver according to claim 1, wherein the power detector unit detects the signal strength on a basis of the down-converted signal.

5. The direct conversion receiver according to claim 1, wherein the power determinator unit sets two threshold values and switches between the first local signal and the second local signal by hysteresis characteristics.

6. The direct conversion receiver according to claim 1, wherein the first local signal is set to the same frequency as a frequency of the received RF signal.

* * * * *